(12) United States Patent
Ebisawa (10) Patent No.: US 7,085,733 B2
(45) Date of Patent: *Aug. 1, 2006

(54) APPARATUS AND METHOD FOR EXECUTING A GAME PROGRAM HAVING ADVERTISEMENTS THEREIN

(75) Inventor: Kan Ebisawa, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/085,675

(22) Filed: Mar. 21, 2005

(65) Prior Publication Data

US 2005/0164757 A1 Jul. 28, 2005

Related U.S. Application Data

(63) Continuation of application No. 10/007,522, filed on Dec. 6, 2001, now Pat. No. 6,882,978, which is a continuation of application No. 09/384,894, filed on Aug. 27, 1999, now abandoned, which is a continuation of application No. 08/672,116, filed on Jun. 27, 1996, now Pat. No. 5,946,664.

(30) Foreign Application Priority Data

Jun. 30, 1995 (JP) .................................. 7-166682

(51) Int. Cl.
*G06F 17/60* (2006.01)

(52) U.S. Cl. ........................................................ 705/14
(58) Field of Classification Search .................... 705/14
See application file for complete search history.

(56) References Cited

U.S. PATENT DOCUMENTS 5,105,184 A   4/1992   Pirani et al.
5,231,566 A   7/1993   Gonokami et al.
5,231,568 A   7/1993   Cohen et al.
5,264,933 A   11/1993  Rosser et al.
5,305,195 A   4/1994   Murphy
5,347,632 A   9/1994   Filepp et al.
5,347,635 A   9/1994   Voeten et al.

(Continued)

FOREIGN PATENT DOCUMENTS

EP   0 337 539 A   10/1989

(Continued)

OTHER PUBLICATIONS

Claria Company Information and Claria Products and Services, www.claria.com.

(Continued)

*Primary Examiner*—Romain Jeanty
(74) *Attorney, Agent, or Firm*—Frommer Lawrence & Haug LLP; William S. Frommer; Thomas F. Presson (57) ABSTRACT

A game system which is operable to update advertisements that are displayed when a game program is executed. The system stores a game program in a memory, receives (i.e., downloads), at predetermined times of operation, for example, on each new day the game program is executed or each time the game program is executed, updated advertising data that relates to at least one advertisement, stores the received advertising data in the memory, executes the game program stored in the memory, and outputs during the execution of the game program display data which corresponds to the stored advertisement data in accordance with the game program code. Further, instead of downloading new advertisements, plural advertisements may be prestored with the game program and only advertisement selection codes are downloaded to update the advertisements that are displayed when the game program is executed.

1 Claim, 11 Drawing Sheets

U.S. PATENT DOCUMENTS

| | | |
|---|---|---|
| 5,373,440 A | 12/1994 | Cohen et al. |
| 5,377,997 A | 1/1995 | Wilden et al. |
| 5,497,479 A | 3/1996 | Hornbuckle |
| 5,512,935 A | 4/1996 | Majeti et al. |
| 5,539,450 A | 7/1996 | Handelman |
| 5,592,212 A | 1/1997 | Handelman |
| 5,624,316 A | 4/1997 | Roskowski et al. |
| 5,636,346 A | 6/1997 | Saxe |
| 5,643,088 A | 7/1997 | Vaughn et al. |
| 5,697,844 A | 12/1997 | Von Kohorn |
| 5,708,960 A | 1/1998 | Kamisaka et al. |
| 5,740,549 A | 4/1998 | Reilly et al. |
| 5,903,317 A | 5/1999 | Sharir et al. |
| 6,141,010 A | 10/2000 | Hoyle |
| 6,208,386 B1 | 3/2001 | Wilf et al. |

FOREIGN PATENT DOCUMENTS

| | | |
|---|---|---|
| EP | 0 620 688 A2 | 10/1994 |
| GB | 2 141 907 A | 1/1985 |
| GB | 2141907 A | 3/1985 |
| GB | 2 194 369 A | 3/1988 |
| JP | 403192391 A | 8/1991 |
| WO | WO 93/14 462 | 7/1993 |
| WO | WO 93/19427 A | 9/1993 |
| WO | WO 93/22017 A | 11/1993 |
| WO | WO 95/12 442 A1 | 5/1995 |
| WO | WO 99 55066 | 10/1999 |

OTHER PUBLICATIONS

"Ads Begin To op Up IN CD-ROMs, Games; Ads begin in Video & Games and CD-ROM" discloses the idea of displaying advertising on consumer video games; Mar. 1995; Billboard; Dialog.

Byrne "Getting the message across", Jul. 1994; Business Mexico v4n7 pp. 8-11; Dialog file 15, Accession No. 00894219.

Channel G

| Software Identification Data (J) | Advertising Data (J-1) | Advertising Data (J-2) | Software Identification Data (K) | Advertising Data (K-1) | Advertising Data (K-2) | Advertising Data (K-3) | Software Identification Data (J) | Advertising Data (J-1) |

Time Lapse →

FIG. 10B

Channel H

| Software Identification Data (P) | Advertising Data (P-1) | Software Identification Data (Q) | Advertising Data (Q-1) | Software Identification Data (R) | Advertising Data (R-1) | Advertising Data (R-2) | Advertising Data (R-3) | Software Identification Data (P) | Advertising Data (P-1) |

Time Lapse →

FIG. 11

APPARATUS AND METHOD FOR EXECUTING A GAME PROGRAM HAVING ADVERTISEMENTS THEREIN

This is a continuation of application Ser. No. 10/007,522 filed Dec. 6, 2001 now U.S. Pat. No. 6,882,978, which is a continuation of Ser. No. 09/384,894 filed Aug. 27, 1999 now abandoned, which is a continuation of application Ser. No. 08/672,116 filed Jun. 27, 1996, now U.S. Pat. No. 5,946,664, the entirety of which is incorporated herein by reference.

BACKGROUND OF THE INVENTION

The present invention relates to apparatus and method for executing a game program having advertisements therein and, more particularly, to apparatus and method for executing a game program in which advertisements displayed therein can be updated by downloading new advertisement data prior to the execution thereof.

As is known, video games or "game machines" are extremely popular and are generally located in video arcades. Many video games, for example, auto racing programs and flight simulators, now are commercially available in the form of game systems and computer programs that may be executed by personal computers in the home. Such game programs, for example, auto racing programs, display background scenario such as houses, city sky-lines, billboards, trees, etc., along with the racing cars to make the auto racing game appear "realistic". To make the game further appear realistic, billboards and other such advertising signs in the racing program display either generic "non-commercial" information, e.g., "New York City 20 Miles Ahead", or an advertisement of the company that produced the software. These advertisements, however, are not commercial advertisements because they are not intended to persuade the viewer to purchase a specific product. Furthermore, even if a particular game program contains an advertisement therein that can be considered to be a commercial advertisement, since game programs generally are not modified once they are released for purchase by the public, there is the possibility that such an advertisement included in the game program will become "obsolete" within a short period of time after the purchase thereof, for example, as when the advertised product is no longer sold.

Therefore, one problem encountered with typical game programs is their general inability to maximize profits made from advertisements that are displayed during the execution thereof. Profits usually are made from the purchase cost of game programs and not from sponsors (i.e., advertisers). If advertisements that are displayed when game programs are executed could be changed in a manner similar to that of television programs, that is, by providing a means for changing commercial advertisements in already purchased game programs, profits on the sale of such game programs would substantially increase. Furthermore, and similar to commercial television, if profits from commercial advertisements in game programs increased, software companies could, in theory, substantially lower the purchase price of such game programs which, in turn, would generally result in the increase of consumer purchases thereof.

OBJECTS OF THE INVENTION

Therefore, it is an object of the present invention to provide apparatus and method for executing a game program having advertisements therein which overcome the shortcomings of existing game programs and systems.

Another object of the present invention is to provide apparatus and method for executing a game program in which the advertisements contained therein can be modified.

A further object of this invention is to provide apparatus and method which inhibits the execution of a game program unless advertisement data therein is up-dated.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method operate to store a game program in a memory, receive (i.e., download via a transmission line) at predetermined times (e.g., on each new day or each time the game program is executed, or each time the game system is turned on) advertising data that relates to at least one advertisement, store the received advertising data in the memory, execute the game program stored in the memory, and output display data which corresponds to the advertisement data stored in the memory in accordance with the game program.

As one aspect of the present invention, the game program is inhibited from being executed when advertisement data is not received at the predetermined times.

As another aspect of the present invention, the game program is received with the advertising data when it is executed the first time.

As yet a further aspect of the present invention, a game identification code, which identifies the game program to be executed, is transmitted to a game service provider, and advertising data that corresponds to the game program identified by the game identification code is received from the game service provider.

As yet another aspect of the present invention, a plurality of advertising data corresponding to a plurality of game programs are received (e.g., via a satellite transmission), and display data which correspond to advertisement data of the executed game program is output during the execution thereof.

In accordance with another embodiment of the present invention, apparatus and method operate to store a game program and advertising data that relates to a plurality of advertisements in a memory, receive at predetermined times advertising selection data that identifies selected advertisements stored in- the memory, execute the game program stored in the memory, and output display data which corresponds to the selected advertisements as identified in the advertising selection data at respective times in accordance with the game program.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1A:
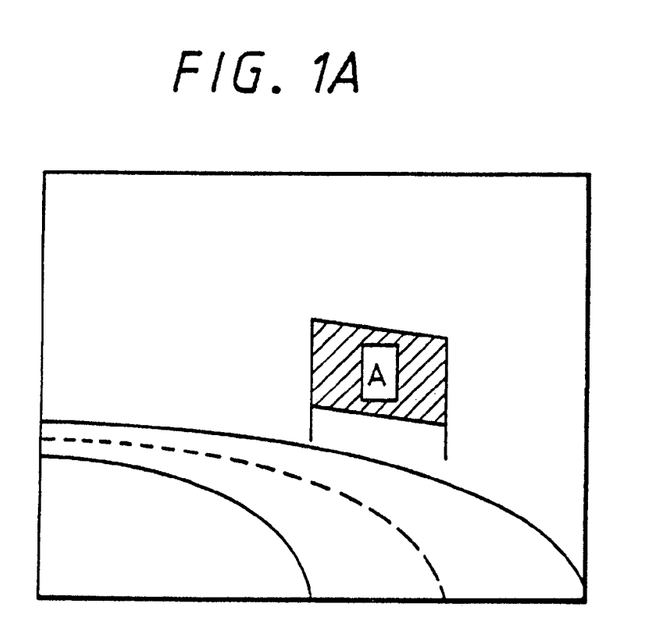
FIGS. 1A and 1B are pictorial representations of an auto racing game in which two different advertisements are displayed.
Figure 1B:
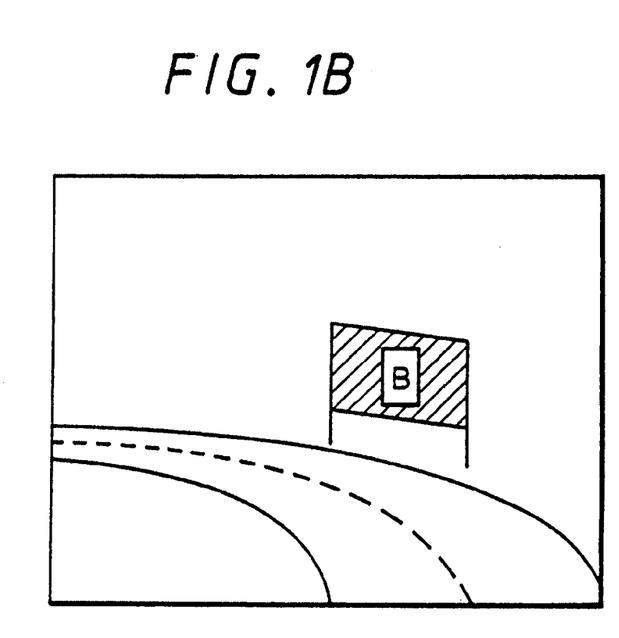
Figure 2A:
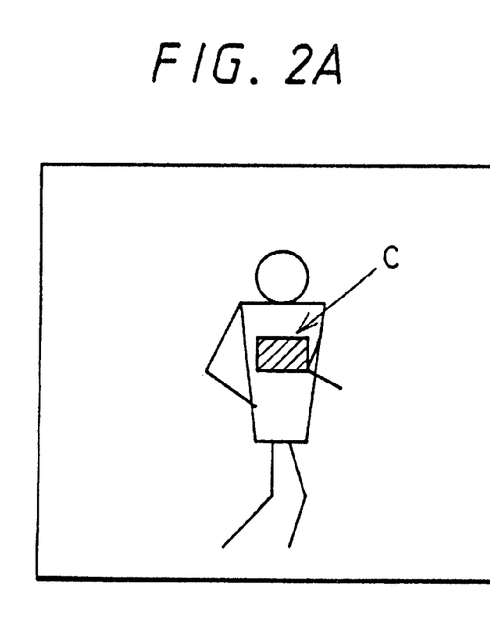
FIGS. 2A and 2B are pictorial representations of another scene of the auto racing game in which two different advertisements are displayed.
Figure 2B:
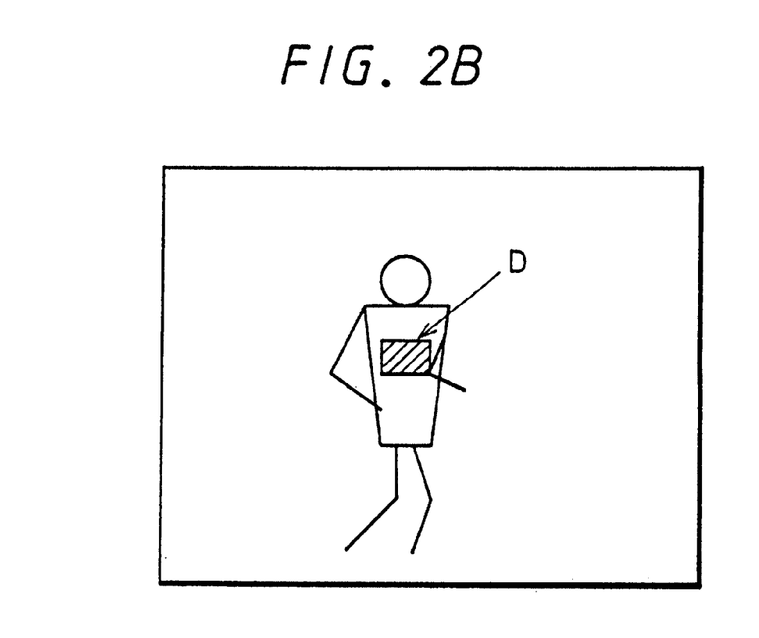

Referring now to the drawings, FIGS. 1A and 1B are pictorial representations of an auto racing game in which a commercial advertisement "A" is displayed on a billboard in FIG. 1A and a different commercial advertisement "B" is displayed on the billboard as shown in FIG. 1B. Similarly, FIGS. 2A and 2B are pictorial representations of another "scene" of the auto racing program in which commercial advertisements "C" and "D", respectively, are displayed on the clothing of the racing car driver. As seen from both set of FIGS. 1A and 1B and FIGS. 2A and 2B, advertisements "A" and "B" are displayed in the same scene of the auto racing program (of course, at different times) and advertisements "C" and "D" also are displayed in the same scene of the auto racing program.

Figure 3A:
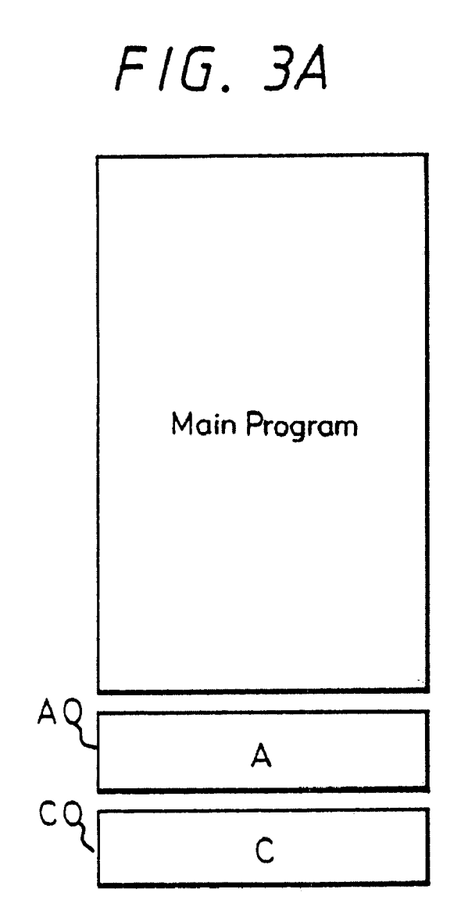
FIGS. 3A and 3B are schematic diagrams of the data structure of a game program stored in the game system of the present invention.
Figure 3B:
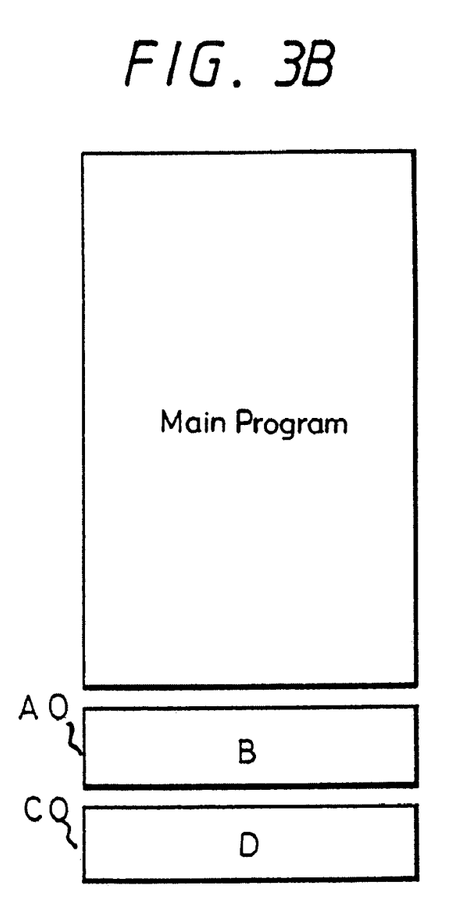

Referring next to FIGS. 3A and 3B of the drawings, the data structure of a game program at two different times of execution (to be discussed) in accordance with the present invention are shown. As shown in FIG. 3A, the game program is comprised of a main program M, which generally represents the entire game program except for advertisement data, and advertisement data A and C, which are stored in memory areas A0 and C0, respectively. Advertisement data A and C represent the commercial advertisements "A" and "C" shown in FIGS. 1A and 2A, respectively. Thus, when a game program having the data structure shown in FIG. 3A is executed, commercial advertisement A is displayed in one scene of the auto racing program and advertisement C is displayed in another scene.

FIG. 3B illustrates the data structure of the same game program shown in FIG. 3A, except advertisement data B and D are stored in memory areas A0 and C0, respectively, instead of advertisement data A and C. Thus, when the auto racing program having the data structure shown in FIG. 3B is executed, commercial advertisement B is displayed (see FIG. 1B) in the same scene advertisement A was displayed and commercial advertisement D is displayed (FIG. 2B) in the same scene advertisement C was displayed. If advertisement data A and C in a game program therefore are replaced by advertisement data B and D, respectively, after the purchase thereof, such a game program would be more valuable to the advertisers. It is appreciated that the main program M and the advertisement data stored in memory areas A0 and C0 may be stored in a single memory or in separate memories, as is well known in the art.

Figure 4:
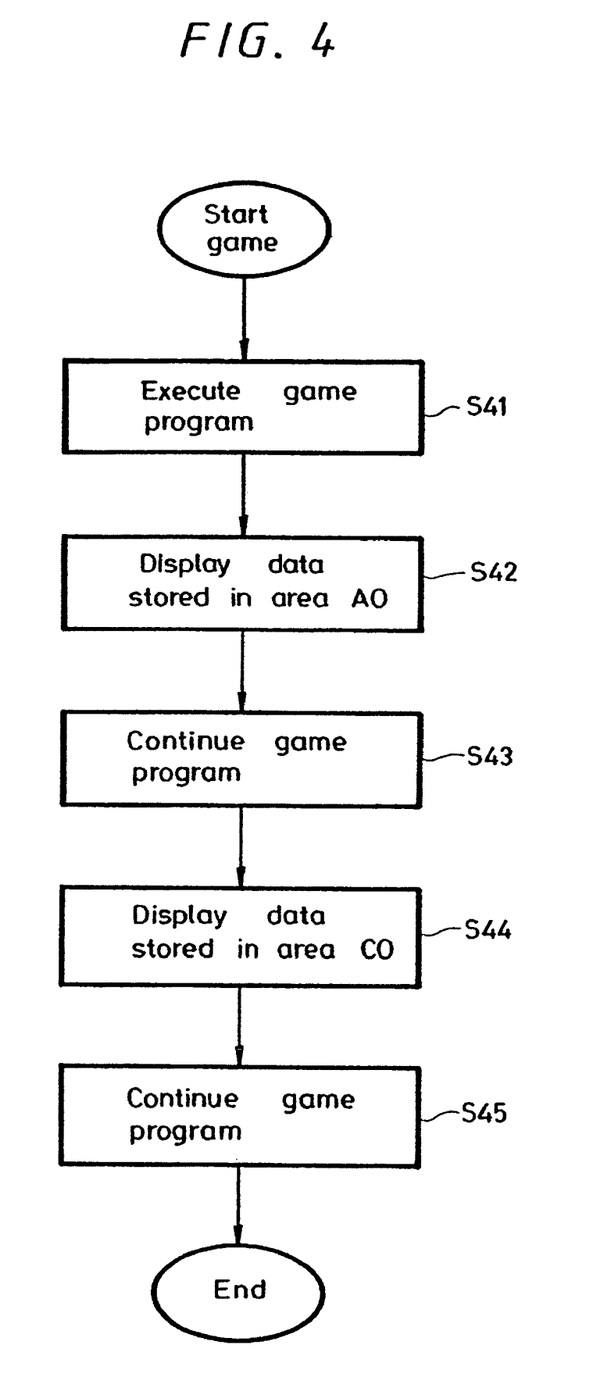
FIG. 4 is a flow chart of the operation of the game system of the present invention.

Referring now to FIG. 4, a flow chart of the operation of a game system in accordance with the present invention is shown. When a home game system is turned on, a game program (e.g., having the data structure shown in FIG. 3A) is executed at instruction S41 and a sequence of operations is performed in accordance with the program code of main program M. At an appropriate time during the execution of main program M, the advertisement data stored in area A0, for example, advertisement data A, is read therefrom and displayed, such as shown in FIG. 1A, at an instruction S42. If, however, advertisement data B is stored in memory area A0, commercial advertisement B (shown in FIG. 1B) is displayed at instruction S42. The game program continues at instruction 43 and, an appropriate time as designated by the game program, the advertisement data stored in memory area C0 is read therefrom and displayed at instruction S44, such as shown in FIG. 2A. Upon completion of instruction S44, the game program continues its operation at instruction S45 until the completion of the program.

Figure 5A:
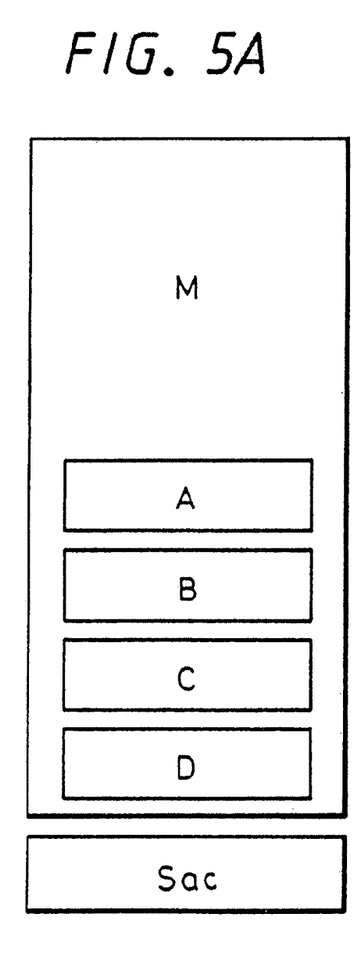
FIGS. 5A and 5B schematically illustrate the data structure of a game program stored in the game system in accordance with another embodiment of the present invention.
Figure 5B:
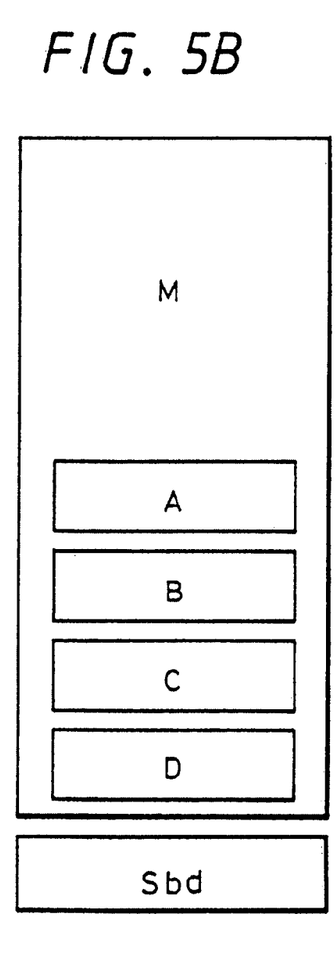

FIGS. 5A and 5B schematically illustrate the data structure of a game program in accordance with another embodiment of the present invention in which main program M and all of the advertisement data A, B, C and D stored therein remains unchanged (i.e., are "fixed" data). However, an advertisement selection code S is variable, wherein FIG. 5a illustrates the data structure of a game program having the advertisement selection code $S_{AC}$ which indicates that advertisement data A and C are selected, and FIG. 5B illustrates the data structure of a game program having the advertisement selection code $S_{BD}$ which indicates that advertisement data B and D are selected. Thus, the main program M and all of the advertisement data A, B, C and D are fixed data and only the advertisement selection code S is "variable" data.

Figure 6:
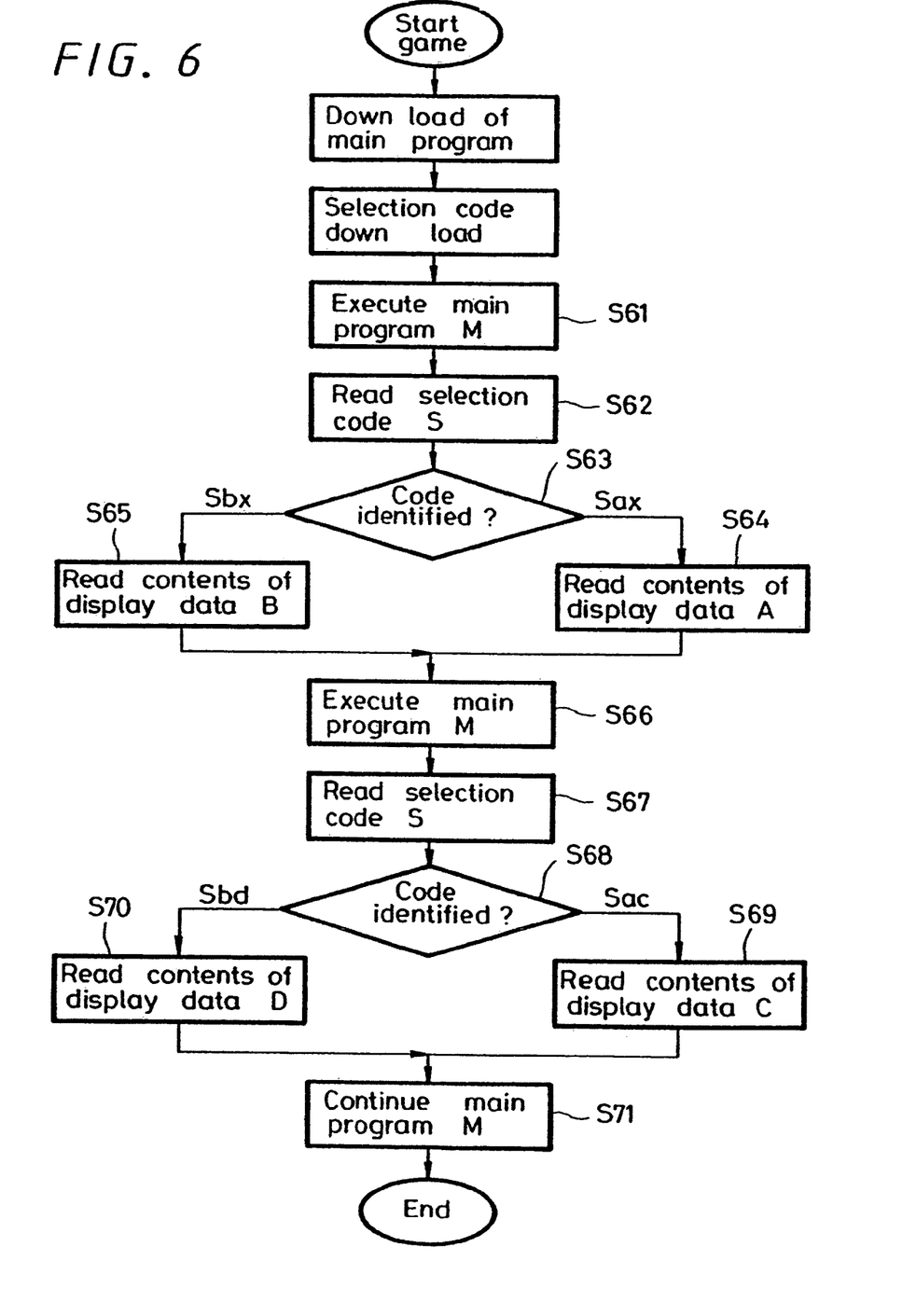
FIG. 6 is a flow chart of the operation of the game system having the data structure shown in FIGS. 5A and 5B in accordance with the present invention.

FIG. 6 is a flow chart illustrating the operation of a game system which executes a game program having a data structure shown in either FIGS. 5A or 5B. When a user selects a particular game to be executed, the game system, at instruction S59, "downloads" from an on-line game system service provider (to be discussed) the fixed data of that particular game, which consists of main program M and advertisement data A, B, C and D shown in FIG. 5A. The main program M and the advertisement data are stored in the game system's memory, typically non-volatile memory. If this fixed data already is stored in the game system's memory, instruction S59 is not executed. Selection code S is downloaded at instruction S60, whether or not instruction S59 is executed, and such selection code S identifies which advertisements are to be displayed during the execution of the game program. Upon downloading of selection code S, main program M is executed at instruction S61 in a manner similar to instruction S41 of FIG. 4, previously discussed, and at an appropriate time during the execution of the game program, selection code S is read from the game system's memory at instruction S62, and the first advertisement to be displayed is identified at inquiry S63. If selection code S identifies commercial "A" as the first advertisement to be displayed (i.e., $S=S_{ax}$), advertisement data A is read from memory and displayed at instruction S64. On the other hand, if advertisement B is identified as the first advertisement to be displayed (i.e., $S=S_{bx}$), advertisement data B is read from memory and displayed at instruction S65. The game program then continues at instruction S66 and at an appropriate time therein, selection code S is read from memory at instruction S67 so that the next commercial advertisement to be displayed can be identified at inquiry S68. If advertisement C is identified by selection code S (i.e., $S=S_{xc}$), then advertisement data C is read from memory and subsequently displayed at instruction S69, but if advertisement D is identified by selection code S (i.e., $S=S_{xd}$), advertisement data D is read from memory and displayed at instruction S70. The game program then continues at instruction S71 until completion. As shown in FIG. 6, "x" in inquiries S63 and S68 represents a "do not care" condition since inquiry 63 is identifying only the first commercial advertisement that is to be displayed and inquiry 68 is identifying only the second commercial advertisement that is to be displayed. Furthermore, FIG. 6 is only an exemplary flow chart of the game system of the present invention, and it is appreciated that there may be more than two commercial advertisements identified by selection code S.

Referring back to FIG. 4, prior to the execution of the game program at instruction S41, the advertisement data stored in memory areas A0 and C0 are downloaded from an on-line game system provider in a manner similar to that performed previously described with reference to FIGS. 5A, 5B and 6. Namely, each time a user wishes to execute a particular game program, the game system downloads advertisement data from an external source and stores the advertisement data in memory areas A0 and C0. Similarly, when a user selects a game program in the game system which operates in the manner shown in FIG. 6, a selection code S, which identifies which advertisements stored in memory are to be displayed during the execution of the game program, is downloaded. However, if the desired game program is not stored in the game system's memory (e.g., on a hard disk, floppy disk, CD ROM, magneto-optical disk, etc.) both of the above-discussed embodiments of the present invention also download the fixed data of the game program. It is seen, therefore, that prior to the execution of a game program on a game system of the present invention, either the particular advertisement data representing the image data of the advertisements that are displayed during the execution of the program are downloaded or the advertisement selection code S is downloaded to the game system. In either case, commercial advertisements are kept "current", and since the amount of advertisement data is relatively small compared to the size of the game program itself, the amount of "download" time is small in the first discussed embodiment. Of course, the download time of advertisement selection code S in the second discussed embodiment is insubstantial.

In accordance with the present invention, updated or "new" advertisement data is downloaded or a new advertisement selection code is downloaded each time a game program is executed. However, such data need not be downloaded every time the game program is executed, and instead, may be downloaded only on a new day or a new week (or month) on which the game program is executed. Since commercial advertisements generally do not change multiple times within the same day, downloading such commercial advertisements more than once per day may be unnecessary. In an alternative embodiment of the present invention, commercial advertisement data or advertisement selection code S is downloaded each time the game system is turned on.

Figure 7:
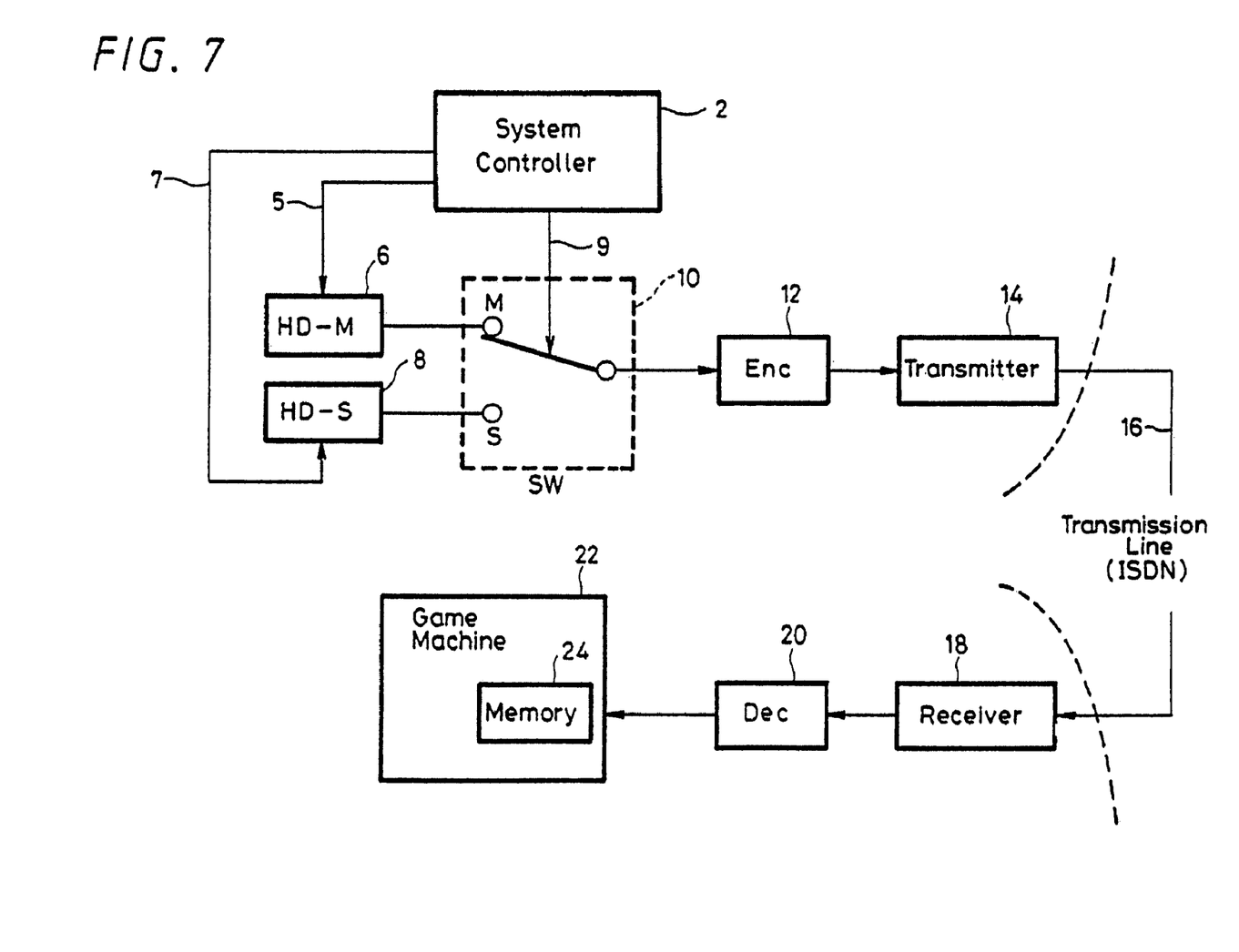
FIG. 7 is a block diagram of both the receiving and transmitting sides of the game system of the present invention.

Referring now to FIG. 7, a block diagram of both the game system (i.e., the receiving side) and a transmission system (i.e., the transmitting side) in accordance with the present invention is shown. The transmission system may be an on-line game system service provider, the game manufacturer itself, a telecommunication company which sells commercial advertisements, or any other suitable system in which the present invention may be applied. The transmission system generally is comprised of a system controller 2, memories 6 and 8 (e.g., hard-disk drives), a switching circuit 10, an encoder 12, and a transmitter 14. The transmission system supplies the main program M of a game and advertisement data to a game system of the present invention which generally is located in the home via a transmission line 16, for example, an ISDN (integrated services digital network), an ordinary telephone line, or any other suitable transmission line. The game system of the present invention generally is comprised of a receiver 18, a decoder 20 and a game machine 22, which includes therein a memory 24, for example, a magneto-optical disk drive or other suitable non-volatile read/write memory.

System controller 2 of the transmitting side shown in FIG. 7 controls memory 6, which stores therein the main program M of a game program, memory 8, which stores therein advertisement data, and switch 10, which switches between the outputs of memories 6 and 8. The advertisement data stored in memory 8 may be changed if it is desired to display a different advertisement when the game program is executed. When main program M is to be downloaded to the game system, in response to a suitable request from the game system, system controller 2 controls memory 6 and switch 10 so that main program M stored in memory 6 is supplied to encoder 12 which encodes the supplied data in a manner well known in the art so that the data is suitable for transmission and supplies the encoded data to transmitter 14 which transmits the encoded data via transmission line 16 to the game system of the present invention. Receiver 18 of the receiving side receives the transmitted signal, decoder 22 decodes the transmitted signal, and game machine 22 stores in memory 24 the decoded signal (i.e., main program M). System controller 2 then controls memory 8 and switch 10 to read out and supply the advertisement data stored in memory 8 so that it may be transmitted to the game system. The advertisement data is received, decoded and stored in memory 24.

When main program M already is stored in memory 24, then only advertisement data stored in memory 8 is transmitted to the game system. As previously mentioned, main program M is stored in memory 6 and advertisement data is stored in memory 8. However, in the previously discussed embodiment described with reference to FIGS. 5A, 5B and 6, main program M as well as advertisement data A, B, C and D are stored in memory 6 and only advertisement selection code S is stored in memory 8. Therefore, only advertisement selection code S is transmitted to the game system when main program M and the advertisement data (i.e., the fixed data) already are stored therein. Of course, and as is well known in the art, memories 6 and 8 may represent different memories of the transmission system or simply different memory locations in the same memory device.

Figure 8:
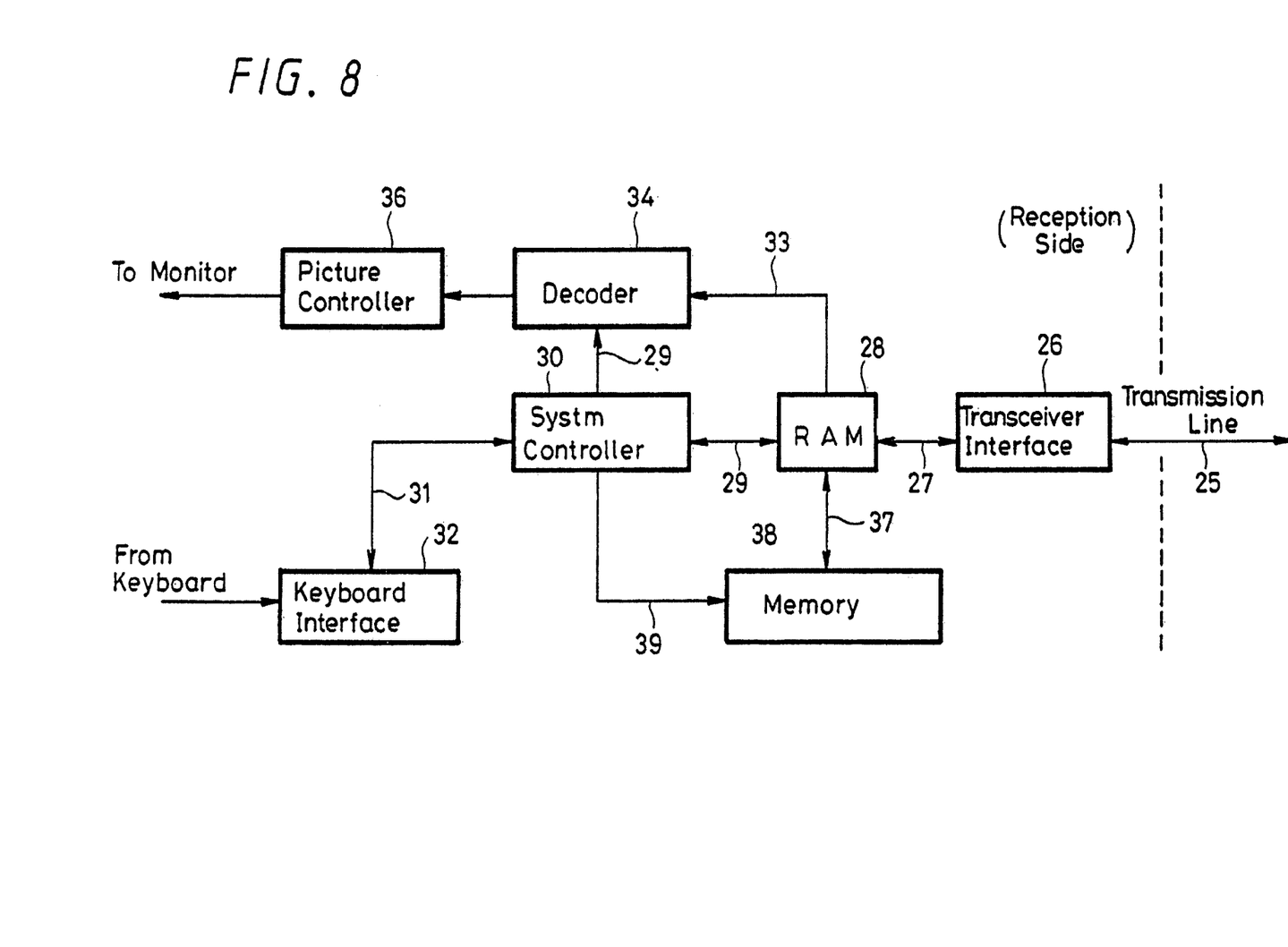
FIG. 8 is a block diagram of the game system in accordance with another embodiment of the present invention.

FIG. 8 is a block diagram of a game system in accordance with another embodiment of the present invention. In this embodiment, a game program stored on a permanent storage medium, for example, an optical disk, is purchased by a user. The optical disk is inserted in a magneto-optical disk drive 38 (or other suitable reproducing device) which reproduces the game program stored thereon. As shown, the game system is comprised of a transceiver/interface 26, a memory 28, a system controller 30, a keyboard interface 32, a decoder 34, a picture controller 36 and memory 38 which is comprised of the magneto-optical disk drive having the optical disk loaded therein. Identification data stored on the optical disk and which identifies the game program stored thereon is reproduced therefrom and transmitted via transceiver 26 to an on-line game service provider, such as disclosed in FIG. 7. In response to the transmission of the identification data, the service provider transfers to the game system shown in FIG. 8 updated "variable" data, which either is the advertisement data (i.e., advertisement data A, B, C or D, or any combination thereof) or advertisement selection code S, as previously discussed. The updated variable data is received by transceiver 26 and stored in memory 28. The variable data stored in memory 28 then is stored on the optical disk of memory 38. Alternatively, the variable data is not permanently stored. In either case, the game program stored on the optical disk is not executed until updated commercial advertisement data is supplied from the service provider.

Upon receiving updated commercial advertisement data, the game program is executed and at an appropriate time, the stored data is decoded in decoder 34 and supplied to picture controller 36 which converts the decoded data to a video signal and which supplies the video signal for display on a video monitor (not shown). Furthermore, user commands are entered on a keyboard (not shown) which is coupled to keyboard interface 32 which decodes the supplied commands and which supplies the decoded commands to system controller 30. System controller 30 controls the operations of the various devices of the game system of the present invention in a manner well known in the art. Thus, the game system of FIG. 8 is similar to the game system shown in FIG. 7 except main program M (along with advertisement data A, B, C, D in the second discussed embodiment) is not downloaded but is stored on a magneto-optical disk that is purchased by a consumer.

Figure 9:
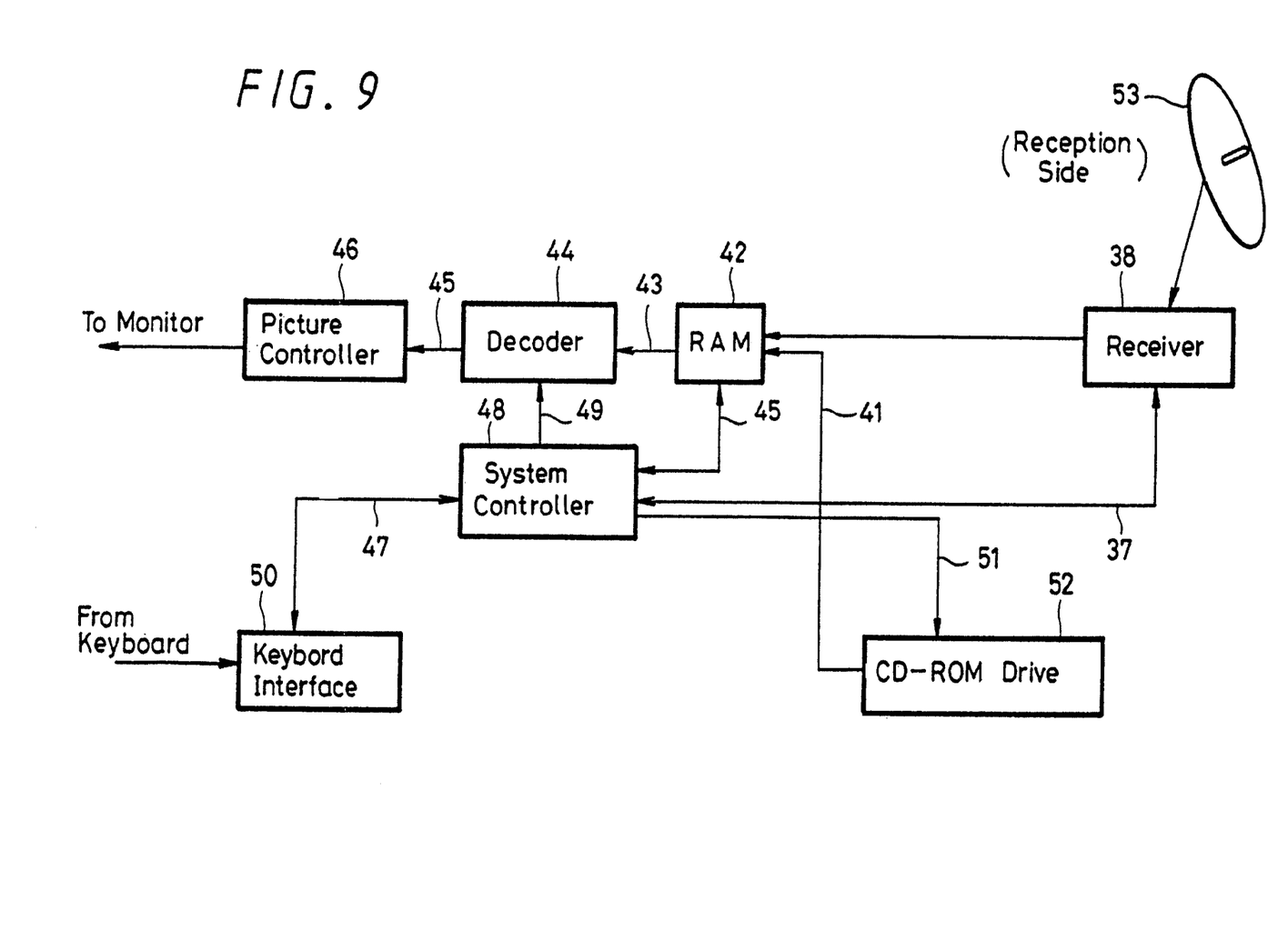
FIG. 9 is a block diagram of the game system in accordance with a further embodiment of the present invention.

FIG. 9 is a block diagram of a further embodiment of the present invention in which the "variable" data (i.e., the advertisement data or the advertisement selection code) is supplied to the game system via a satellite transmission. In the embodiment of FIG. 9, the variable data is repeatedly transmitted over a satellite transmission such that the system of FIG. 9 only "waits" for a relatively short period of time before receiving the variable data that corresponds to the particular game program that has been selected to be executed. When a user inserts in CD ROM drive 52 a CD ROM (or magneto-optical disk) having a game program stored thereon and executes via keyboard interface 50 the game program, a game identification code stored on the CD ROM is reproduced therefrom and supplied to random access memory (RAM) 42 in a manner similar to that previously described with reference to FIG. 8. System controller 48 then ascertains the transmission channel on which the variable data corresponding to the selected game program is transmitted and controls receiver 40 to receive satellite transmissions on the ascertained channel.

Figure 10A:
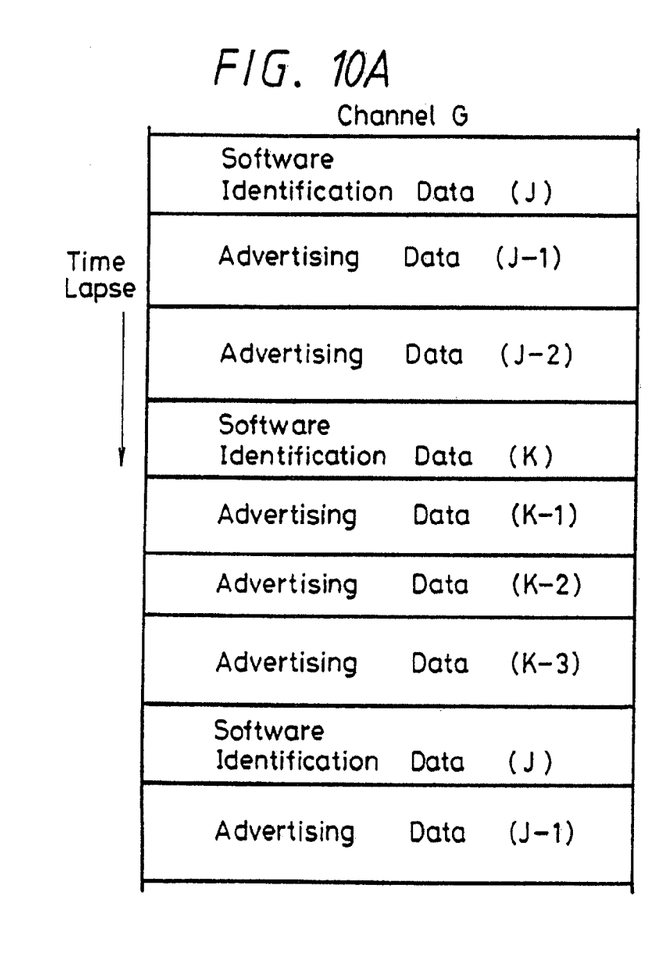
FIGS. 10A and 10B are schematic diagrams of the data structure of game data received by the game system shown in FIG. 9.
Figure 10B:
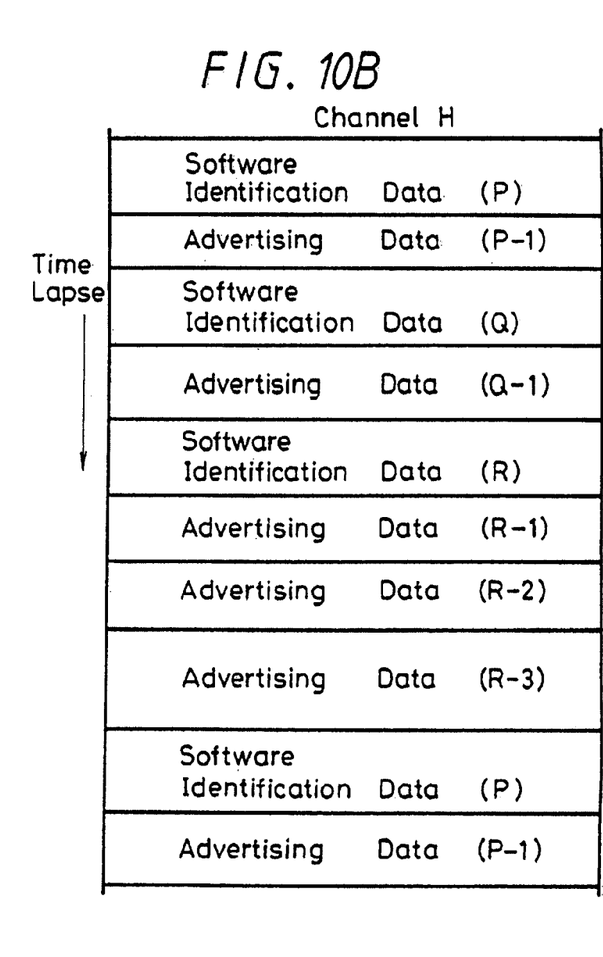

FIGS. 10A and 10B illustrate the data structure of data transmitted over two different channels of a satellite transmission. As shown, FIG. 10A shows the data transmitted on a channel G and FIG. 10B shows the data transmitted on a channel H. Channel G includes thereon data corresponding to two game programs J and K, and channel H includes thereon data corresponding to three game programs P, Q and R. If the executed game program corresponds to, for example, game J on channel G, receiver 40 is controlled to receive data transmitted on channel G, and upon receipt of software identification data J on channel G, advertising data J-1 and J-2 transmitted thereafter are stored in memory 42 as, for example, commercial advertisements A and C, respectively. The advertisement data further may be stored in a non-volatile memory, e.g., a hard disk or M-O disk, so that the advertisement data does not need to be downloaded again in the event of a power failure. Furthermore, the game system may be designed to require that updated advertisement data be downloaded each time the game is executed, or each new day (or week, etc.) on which the game is executed, or each time the system is turned on, or at any other desired interval of time. The game program then is executed in a manner similar to that previously described with reference to FIG. 8.

Figure 11:
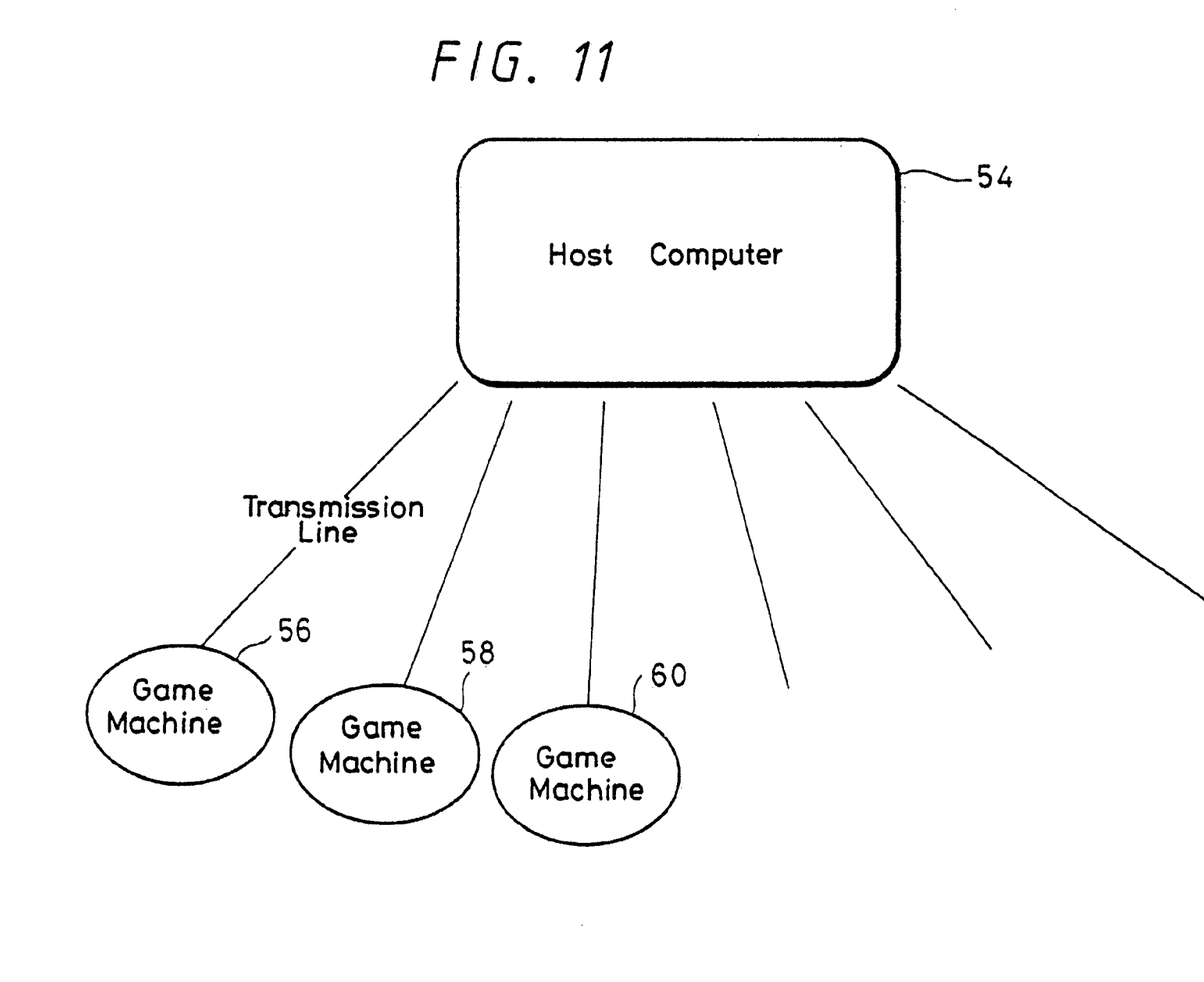
FIG. 11 is a schematic diagram showing multiple game systems which receive game data from a single host computer in accordance with the present invention.

FIG. 11 is a schematic diagram showing a plurality of game systems 56, 58, 60 . . . each interacting with a host computer 54 (i.e., the game service provider) via plural transmission lines. It is seen that since main program M of a game program is only downloaded to each game system at most one time and since advertisement data or advertisement selection codes have a relatively small amount of data, the transmission thereof is relatively short so that a transmission system generally will be operable to service a relatively large number of home game systems.

In each of the above discussed embodiments, commercial advertisements are updated on a regular basis such that profits made from such advertisements can be expected to substantially increase. Furthermore, since the amount of advertisement data that is downloaded to a game system is relatively small compared to the amount of data in a game program, download times are relatively short. Still further, the game system shown in FIG. 9 operates to download updated advertisement data in a manner that is transparent to a user of such game system.

While the present invention has been particularly shown and described in conjunction with the preferred embodiments thereof, it will be readily appreciated by those of ordinary skill in the art that various changes may be made without departing from the spirit and scope of the invention. For example, although the present invention has been described as displaying two commercial advertisements from a selection of four advertisements, the present invention is not limited to these number of advertisements and may be applied to game programs that display a relatively large number of, e.g. 20, advertisements during the execution of a particular game.

As another example, although the present discussion is directed to home game systems, the present invention is not limited solely to the home and may be widely applied to game systems located in other locales, including game arcades and companies.

Therefore, it is intended that the appended claims be interpreted as including the embodiments described herein, the alternatives mentioned above, and all equivalents thereto.

What is claimed is:

1. An apparatus for executing an executable game program displaying data having a plurality of images, said plurality of images including advertisements therein, comprising:

storage means for storing an executable game program and identification data that identifies the stored game program;

means for receiving new advertising data corresponding to the stored game program on a recurring basis relating to at least one advertisement, and wherein said storage means stores the received new advertising data; and execution means for executing said executable game program stored in said storage means and outputting display data incorporating the new advertising data stored in said storage means within an originally displayed plurality of images generated by said executable game program, wherein said executable game program is inhibited from being executed when said advertisement data is not received at predetermined times.

* * * * *